(12) United States Patent
Tselikov et al.

(10) Patent No.: US 6,324,319 B1
(45) Date of Patent: Nov. 27, 2001

(54) SPLICED OPTICAL FIBER COUPLER

(75) Inventors: Alexander Tselikov, Fremont, CA (US); Ronald E. Gerber, Richfield, MN (US); Edward C. Gage, Apple Valley, MN (US); Gregory S. Mowry, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/357,782

(22) Filed: Jul. 21, 1999

Related U.S. Application Data

(60) Provisional application No. 60/111,470, filed on Dec. 9, 1998.

(51) Int. Cl.[7] ............................ G02B 6/00; G02B 6/26
(52) U.S. Cl. ............................................. 385/28
(58) Field of Search ............................ 385/28, 1, 11, 385/56, 51, 36, 147

(56) References Cited

U.S. PATENT DOCUMENTS

| | | | |
|---|---|---|---|
| 4,709,986 | * 12/1987 | Hicks, Jr. | 385/51 |
| 4,832,437 | * 5/1989 | Kim et al. | 385/1 |
| 5,159,481 | * 10/1992 | Maeda et al. | 385/11 |

* cited by examiner

*Primary Examiner*—Akm E. Ullah
(74) *Attorney, Agent, or Firm*—Moser, Patterson & Sheridan, LLP

(57) ABSTRACT

In general, the mode field pattern of a single-mode polarization-maintaining fiber is symmetric. There are preferred axes for the polarization states, but the intensity pattern emerging from the fiber is rotationally symmetric. If a short piece of multi-mode fiber is spliced onto the end of a polarization-maintaining single-mode fiber, it is possible to change the apparent shape of the mode field. The use of a fusion splicer affects the stress pattern in polarization-preserving fiber, and introduces asymmetry into the shape of the fiber mode field. If the spliced fiber is cleaved near the splice, and the asymmetry of the fiber mode field is matched to the asymmetry of a laser diode beam, then the laser beam is coupled efficiently into the fiber without the use of additional beam-shaping optics. The asymmetric beam from the laser is brought to a focus, which is also asymmetric. By matching the asymmetries of the focused spot and the distorted mode field (caused by the addition of the short piece of multi-mode fiber), good coupling is achieved into the fiber. Once the light has entered the spliced fiber and propagated past the splice, the mode field returns to its original symmetric pattern and the light propagates in a single mode, as it would in an unspoiled, single-mode polarization-maintaining fiber. The output from the unspoiled end is still symmetric, and there is little attenuation caused by the splice.

20 Claims, 5 Drawing Sheets

SPLICED OPTICAL FIBER COUPLER

RELATED APPLICATIONS

The present invention is related and claims priority to Provisional Application No. 60/111,470, filed Dec. 9, 1998, and is incorporated herein by reference.

SCOPE OF THE INVENTION

The present invention relates generally to altering the mode field pattern exhibited by single-mode optical fibers and more particularly to altering the mode field pattern exhibited by optical fibers that are used in optical storage drives.

BACKGROUND

In magneto-optical storage systems that use magneto-optical (MO) recording material deposited on a rotating disk, information may be recorded on the disk as spatial variations of magnetic domains. During readout, a magnetic domain pattern modulates an optical polarization, and a detection system converts a resulting signal from optical to electronic format.

In one type of a magneto-optical storage system, a magneto-optical head assembly is located on an actuator that moves the head to position the head assembly over data tracks during recording and readout. A magnetic coil is used to create a magnetic field that has a magnetic component in a direction perpendicular to the disk surface. A vertical magnetization of polarity, opposite to that of the surrounding magnetic material of the disk medium, is recorded as a mark indicating zero or a one by first focusing a beam of laser light to form an optical spot on the disk. The optical spot functions to heat the magneto-optical material to a temperature near or above a Curie point (a temperature at which the magnetization may be readily altered with an applied magnetic field). A current passed through the magnetic coil orients the spontaneous vertical magnetization either up or down. This orientation process occurs in the region of the optical spot where the temperature is suitably high. The orientation of the magnetization mark is preserved after the laser beam is removed. The mark is erased or overwritten if it is locally reheated to the Curie point by the laser beam during a time the magnetic coil creates a magnetic field in the opposite direction.

Information is read back from a particular mark of interest on the disk by taking advantage of the magnetic Kerr effect so as to detect a Kerr rotation of the optical polarization that is imposed on a reflected beam by the magnetization at the mark of interest. The magnitude of the Kerr rotation is determined by the material's properties (embodied in the Kerr coefficient). The sense of the rotation is measured by established differential detection schemes and, depending on the direction of the spontaneous magnetization at the mark of interest, is oriented clockwise or counter-clockwise.

Conventional magneto-optical heads tend to be based on relatively large optical assemblies which make the physical size and mass of the head rather bulky (typically 3–15 mm in a dimension). Consequently, the speed at which prior art magneto-optical heads are mechanically moved to access new data tracks on a magneto-optical storage disk is slow. Additionally, the physical size of the prior art magneto-optical heads limits the spacing between magneto-optical disks. Because the volume available in standard height disk drives is limited, magneto-optical disk drives have not been available as high capacity commercial products.

N. Yamada (U.S. Pat. No. 5,255,260) discloses a flying optical head for accessing an upper and lower surface of a plurality of optical disks. The flying optical head disclosed by Yamada describes an actuating arm that has a static (fixed relative to the arm) mirror or prism mounted thereon, for delivering light to and receiving light from a phase-change optical disk. While the static optics described by Yamada provides access to both surfaces of a plurality of phase-change optical disks contained within a fixed volume, Yamada is limited by the size and mass of the optics. Consequently, the performance and the number of optical disks that can be manufactured to function within a given volume is also limited.

Utilization of optical fibers to deliver light to a storage location within an optical disk drive allows for a lower profile optical path which can increase the number of disks that can be vertically positioned within a given form factor. In a magneto-optical storage drive, polarization-maintaining optical (PM) fiber is typically used to convey laser light delivered by inexpensive laser diodes. The mode field that is exhibited by single-mode optical fiber is typically circularly symmetric. Because the mode field of a Fabry Perot laser diode is typically asymmetric, the mode field mismatch may create optical inefficiencies that result in a reduced signal to noise ratio in the detected data signal.

What is needed, therefore, is a method and apparatus that enables a laser source exhibiting an asymmetric mode field to be used with polarization maintaining optical fiber so as to efficiently convey light between a laser source and a storage location of an optical data storage system.

SUMMARY

The present invention includes an optical apparatus for directing a laser light exhibiting a first mode field along an optical path between a source and a data storage location. The optical apparatus may comprise: a first optical element, wherein the first optical element is disposed in the optical path, wherein the first optical element exhibits a second mode field; and a second optical element, wherein the second optical element is disposed in the optical path, and wherein the second optical element matches the first and second mode fields to each other. The first mode field may comprise a asymmetric mode field. The second mode field may comprise an symmetric mode field. The asymmetric mode field may be elliptical. The symmetric mode field may be circular. The first optical element may comprise a single mode polarization maintaining optical fiber. The second optical element may comprise a multi-mode optical fiber or a anamorphic prism. The source may comprise a Fabry Perot laser diode.

The present invention may also comprise a method for directing a laser light along an optical path between a source and a data location that comprise the steps of: providing a source of light that exhibits a first mode field in the optical path; providing a first optical element that exhibits a second mode field in the optical path; and matching the first and second fields to each other by providing a second optical element in the optical path.

In the present invention the coupling efficiency into an optical fiber is maximized when a focused spot size and shape are matched to the size and shape of the optical fiber mode field. The light emerging from a laser diode is generally asymmetric (in that light diverges more quickly along one axis of the beam), and if a simple lens is used to focus the laser light without any beam-shaping optics, the focused spot is asymmetric as well. In general, the mode field of a single-mode PM fiber is symmetric. The present invention modifies the mode field of the single-mode PM fiber, and generates an asymmetry that matches that of the focused spot in order to achieve efficient coupling.

In the present invention, a short piece of multi-mode fiber is fusion spliced to a single-mode PM fiber. (A longer piece of multi-mode fiber may be used during splicing, and then cleaved back.) Typical lengths of the multi-mode fiber piece vary between 50% and 100% of the cladding diameter, and the operation of the invention does not depend critically on the exact length.

In order to achieve efficient coupling, the light from a laser source should be focused onto the splice between the multi-mode fiber piece and the single-mode PM fiber. Because the fiber materials on either side of the splice are nearly identical in refractive index, there is very little light reflected back to the laser from the splice. This helps reduce feedback into the laser, and reduces laser noise. The reflection from the other end of the piece of multi-mode fiber is out of focus with respect to the laser; most of the reflected light does not re-enter the laser cavity, and does not significantly contribute to the laser noise.

In the present invention, it is possible to align the polarization axes of the PM optical fiber while the optical fiber tip is being aligned to a focused beam from the source. If the focused beam spot size and shape are matched to the size and shape of the optical fiber mode field, then any misalignment between the polarization axes of the optical fiber and the polarization axis of the beam will show up as a loss in coupling efficiency. If the coupling efficiency is maximized, then the optical fiber polarization axes are automatically aligned to the beam, and a time-consuming alignment step can be avoided. Thus, a simple coupling efficiency measurement (optical power) replaces a complicated polarization measurement.

DESCRIPTION OF THE INVENTION

Figure 1:
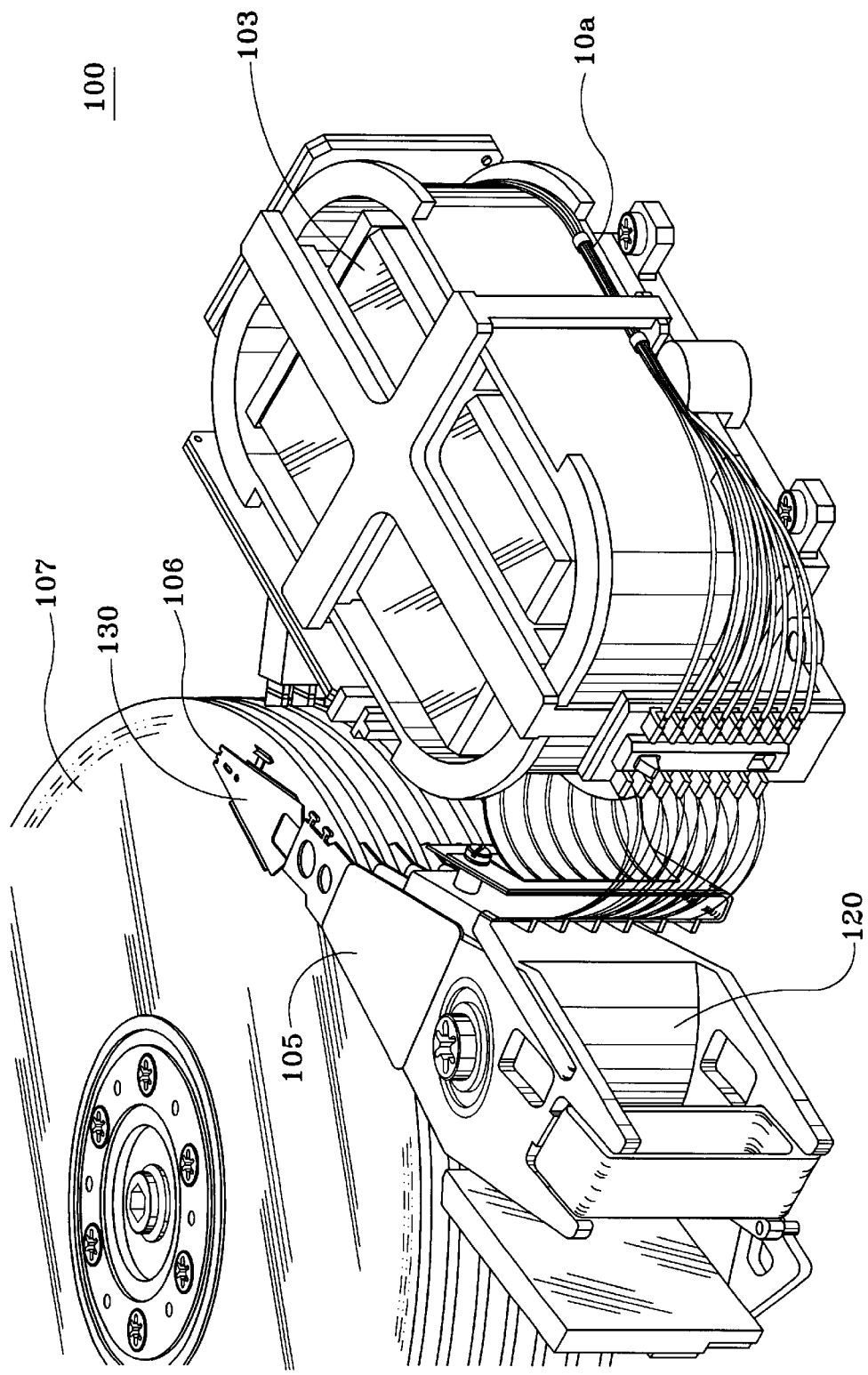
In FIG. 1, there is seen a magneto-optical storage and retrieval system.

Referring in detail now to the drawings wherein similar parts of the invention are identified by like reference numerals, there is seen in FIG. 1 a magneto-optical storage and retrieval system 100, generally illustrated in a perspective view. In a preferred embodiment, the magneto-optical (MO) data storage and retrieval system 100 includes a set of Winchester-type flying heads 106 that are adapted for use with a set of double-sided first surface MO disks 107 (one flying head for each MO disk surface). The set of flying heads 106 are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor so as to generate aerodynamic lift forces between the set of flying MO heads 106 and the set of MO disks 107 and to maintain the set of flying MO heads 106 in a flying condition above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107. System 100 further includes an optics module 103 and a set of single-mode polarization maintaining (PM) optical fibers 102 coupled thereto. The optical fibers 102 each have a proximal optics module end and a distal head end.

Figure 2:
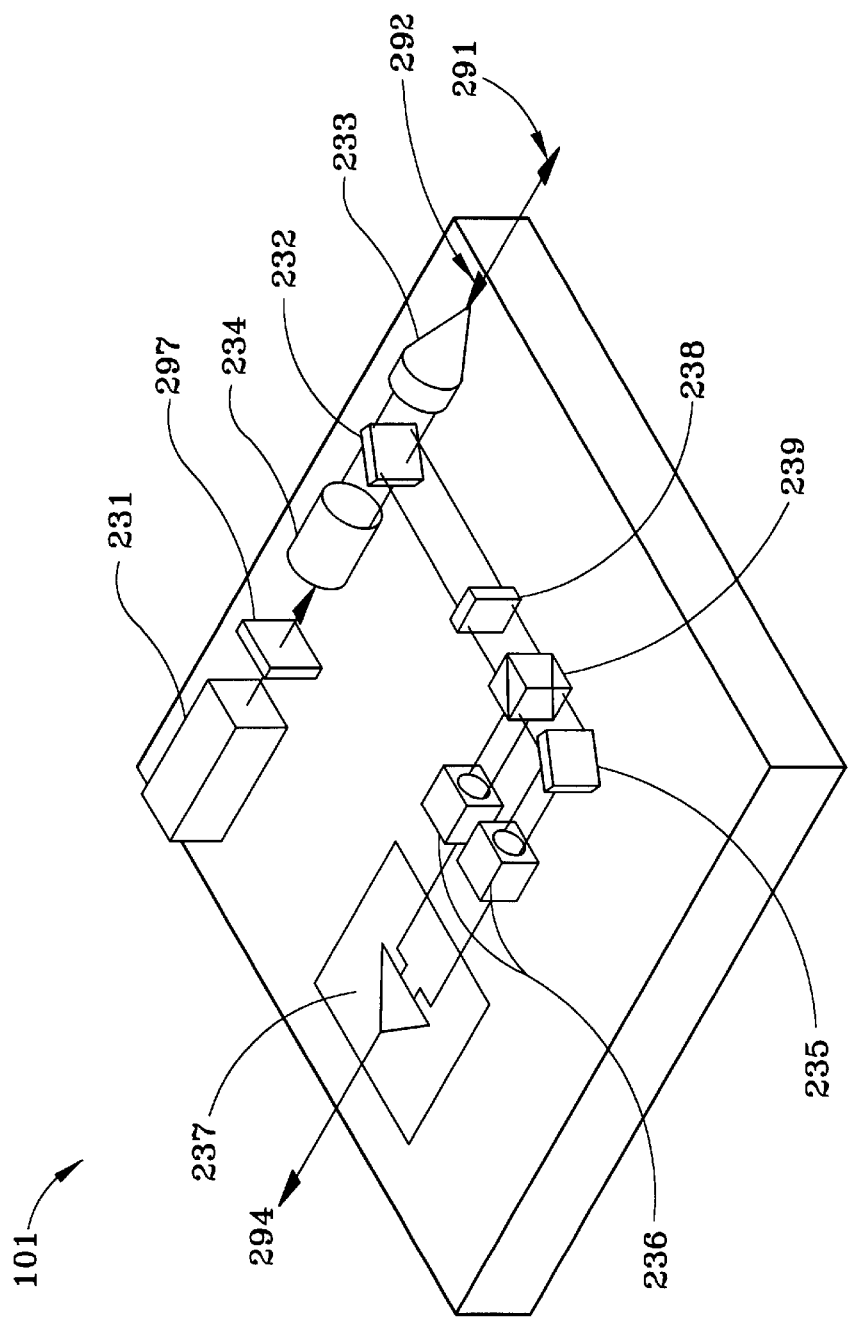
In FIG. 2, there is seen as part of the laser optics module a laser-optics assembly.

Referring now to FIG. 2, there is seen as part of the laser optics module 103 a laser-optics assembly 101. In the present invention, the optics module 103 of FIG. 1 comprises laser-optics assembly 101, which includes a laser source 231, such as a Fabry Perot laser source of a variety that is well known in the art. The laser-optics assembly 101 further includes: collimating optics 234, a leaky beam splitter 232, and a coupling lens 233. The laser-optics assembly 101 directs a P polarized laser beam 291 from the laser source 231 through the leaky beam splitter 232 and coupling lens 233, and towards an optical switch 304 (see FIG. 3). The laser-optics assembly 101 also receives S and P polarization components of a reflected laser beam 292 from the surface of a particular MO disk 107. The reflected laser beam 292 is directed by the coupling lens 233 and is routed by the leaky beam splitter 232 towards a differential detector comprising: a polarizing beam splitter 239, a mirror 235, and a set of photo-diodes 236. After conversion by the set of photo-diodes 236, the differential signal is processed by the differential amplifier 237 and is output as signal 294. The differential detector detects orthogonal S and P polarization components of the reflected laser beam 292, with a differential signal being preferably a sensitive measure of polarization rotation induced by a Kerr effect at the surface of the particular MO disk 107.

Figure 3:
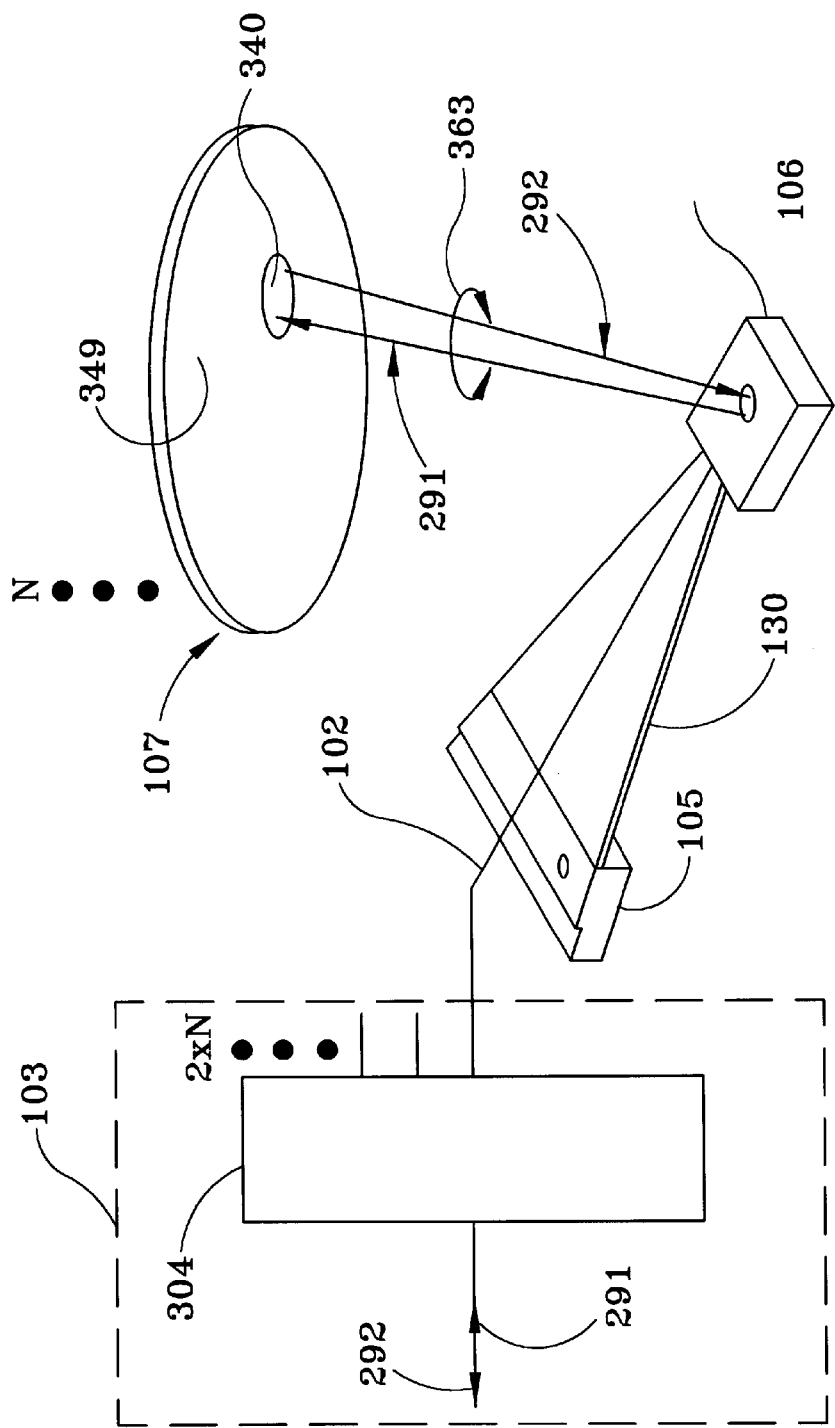
In FIG. 3, there is seen as part of the optics module an optical switch.

Referring now to FIG. 3, there is seen as part of the laser optics module 103 an optical switch 304. The optical switch 304 is disposed between the set of optical fibers 102 and the laser optics-assembly 101 and is shown in a representative optical path that includes one of the set of PM optical fibers 102, one of the set of flying MO heads 106, and one of the set of MO disks 107. The optical switch 304 provides sufficient degrees of selectivity so as to direct the outgoing laser beam 291 towards a respective proximal end of a particular optical fiber 102. The outgoing laser beam 291 exits the distal end of the optical fiber 102 and is directed through the flying MO head 106 onto a surface recording layer 349 of a respective MO disk 107.

During writing of information, the outgoing laser beam 291 lowers a coercivity of the surface recording layer 349 by heating a selected spot of interest 340 to approximately the Curie point of the MO recording layer 349. The optical intensity of outgoing laser beam 291 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 291 may be modulated in synchronization with the time varying vertical bias magnetic field at the spot of interest 340 in order to better control domain wall locations and reduce domain edge jitter. Subsequently, as the selected spot of interest 340 cools at the surface layer 349, information is encoded at the surface of the respective spinning disk 107.

During readout of information, the outgoing laser beam 291 (at a lower power compared to writing) is selectively routed to the MO disk 107 such that upon its reflection from the spot of interest 340 the Kerr effect causes a polarization state of the reflected laser beam 292 to be rotated either clockwise or counter clockwise (as indicated with arrow 363). The aforementioned optical path is bi-directional in nature. Accordingly, the reflected laser beam 292 is received through the flying MO head 106 and enters the distal end of the optical fiber 102. The reflected laser beam 292 is directed by the PM optical fiber 102 towards the optical switch 304 and is selectively routed by the optical switch 304 towards the laser-optics assembly 101 for subsequent optical-to-electrical signal conversion.

Figure 4:
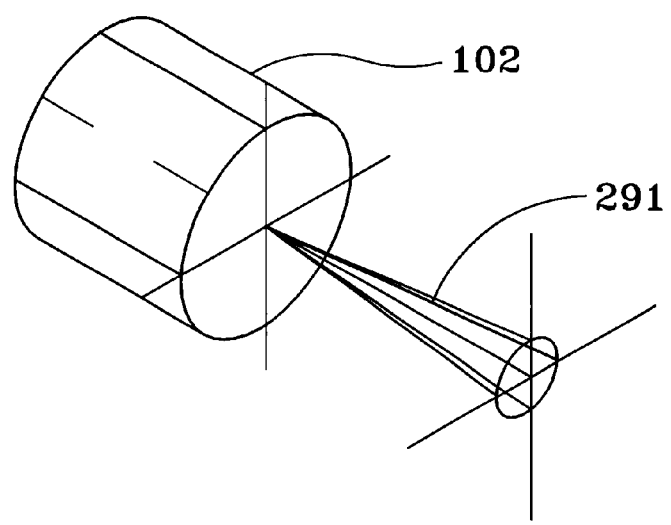
In FIG. 4, there is seen that a single-mode PM optical fiber may exhibit a circularly symmetric mode field pattern.

Referring now to FIG. 4, there is seen that single-mode PM optical fibers 102 exhibit a circularly symmetric mode field pattern. In the present invention, it is desired to efficiently couple the laser beam 291 from the laser source 231 into the PM optical fiber 102 and to maintain a sufficient signal to noise ratio of the signal 294 while doing so. It is well known in the art that a laser beam exhibiting a circularly symmetric mode field that is directed into an optical fiber exhibiting a circularly symmetric mode field, will emerge from the optical fiber exhibiting its original circular symmetric mode field. However, it is also well known in the art that the laser beam 291 from diode laser sources such a Fabry Perot laser source may exhibit an asymmetric mode field, for example an elliptic mode field. Because the mode field of a Fabry Perot laser source is typically asymmetric, a mode field mismatch between the laser source 231 and the PM optical fibers 102 may be created and thus result in optical inefficiencies and reduced signal to noise ratio in the detected data signal 294. Because an increased signal to noise ratio is preferred, it follows that the mode field of the laser beam provided by the laser source 231 should be matched as closely as possible to the mode field of the PM optical fiber 102.

The advantages of mode field matching and the resulting concomitant efficient coupling include: (1) the ability to use a lower-power (and less expensive) laser may for a given application, (2) the same laser may be used at a lower operating power (and greater reliability), and (3) the alignment tolerances of the system may be loosened, compared with the inefficient coupling case.

Figure 5:
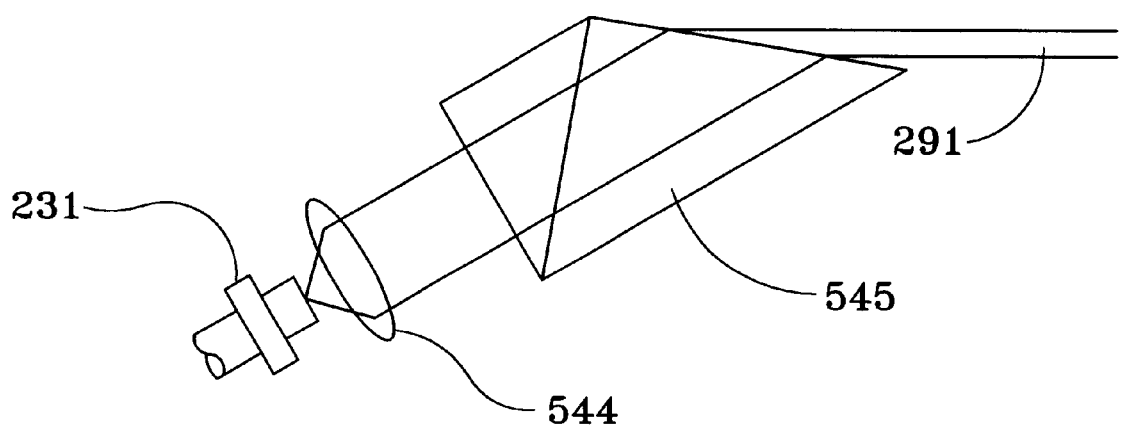
In FIG. 5, there is seen one embodiment of the present invention.

Referring now to FIG. 5, there is seen one embodiment of the present invention. In this embodiment, a collimated laser beam 291 from the laser source 231 may be directed towards an anamorphic prism 545. The laser beam 291 emerging from the prism 545 is preferably compressed in By choosing a proper compression ratio, the asymmetric mode field of the laser beam 291 emerging from the prism may be made circular in profile. Because the circularly symmetric mode field of the resulting laser beam 291 is coupled into the circularly symmetric mode field of the optical fiber 102 a desired optical efficiency may be achieved.

Figure 6:
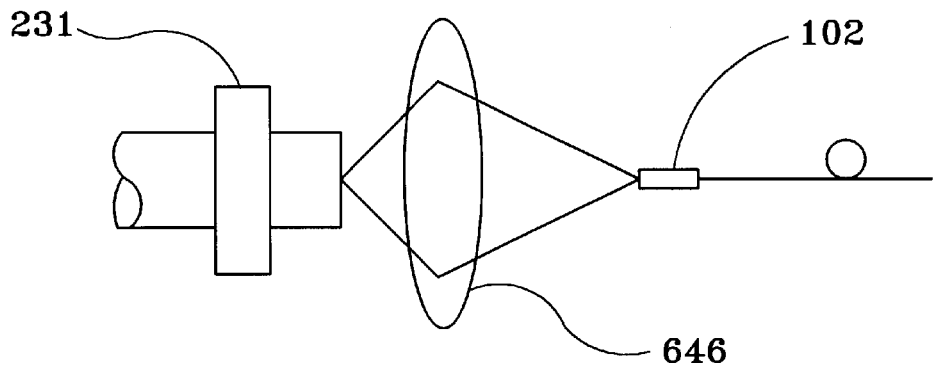
In FIG. 6, there is seen a second embodiment of the present invention.

Referring now to FIG. 6, there is seen a second embodiment of the present invention. In the second embodiment, the laser beam 291 is brought to focus by a lens 646 (or combination of lenses). Because the laser beam 291 from the laser source 231 exhibits an asymmetric mode field, the beam 291 is focused as a spot with an asymmetric mode field. In this embodiment, however, the circularly symmetric mode field exhibited by the PM optical fiber 102 is altered by coupling the proximal end of the PM optical fiber 102 to a short piece of multi-mode optical fiber. As described below, this combination of optical fibers exhibits an asymmetric mode field that is matched to that of the laser beam 291. As in the first embodiment, because the mode field of the laser beam 291 matches the mode field of the optical fiber combination conveying it, optical inefficiencies are reduced to provide improved signal to noise ratio in the signal 294. In an exemplary embodiment of the present invention, coupling efficiencies are improved about 20%.

In typical polarization-maintaining fiber applications, the alignment of the polarization axes of a PM optical fiber to a polarized laser beam is a difficult process. Typical alignment steps may include analysis of the polarization state of the transmitted beam, or analysis of the noise induced by polarization degradation. These are time-consuming steps, and are preferably avoided if possible.

In the present invention, it is possible to align the polarization axes of the PM optical fiber 102 while the optical fiber tip is being aligned to the beam 291. If the focused beam 291 spot size and shape are matched to the size and shape of the optical fiber 102 mode field, then any misalignment between the polarization axes of the optical fiber 102 and the polarization axis of the beam 291 shows up as a loss in coupling efficiency. If the coupling efficiency is maximized, then the polarization axes of the optical fiber 102 can be automatically aligned to the beam 291, and a time-consuming alignment step may be avoided. Thus, a simple coupling efficiency measurement (optical power) may replace a complicated polarization measurement.

It is understood that the polarization axis of the optical fiber 102 may be also aligned by a rotatable half-wave plate (not shown) inserted in the optical path of the beam 291.

Figure 7:
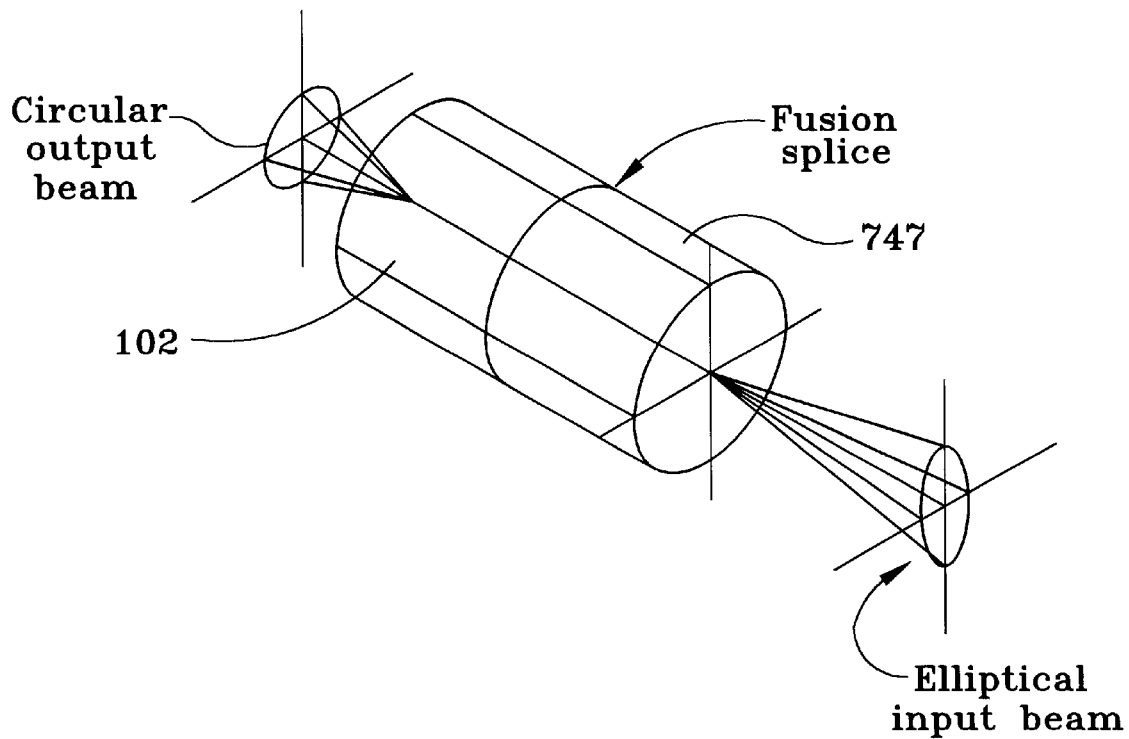
In FIG. 7, there is seen a multi-mode fiber spliced to a single-mode PM fiber.

Referring now to FIG. 7, there is seen a multi-mode fiber spliced to a single-mode PM fiber. In the second embodiment it has been identified that if a short piece of multi-mode optical fiber 747 is spliced to the proximal end of a single-mode PM optical fiber 102, the shape of the mode field exhibited by the optical fiber 102 may be altered. Multi-mode fiber is a type of fiber that is well known in the art. The techniques required for spicing optical fibers to each other are also well known in the art. In the second embodiment, it has been identified that in the process of splicing the multi-mode optical fiber 747 to the PM optical fiber 102, the stress pattern in the fiber core of the PM optical fiber 102 is affected such that mode field at the junction of the spliced optical fiber combination is asymmetric, that little if any attenuation is introduced, and that the polarization preserving qualities of the PM optical fiber 102 are minimally unaffected. Once the laser beam 291 from the laser source 231 propagates past the adiabatic taper region of the splice, the mode field pattern is altered to be symmetric again, and the laser beam 291 exits the distal end of the optical fiber 102, 747 with a circular mode field. Measurements have shown that the aspect ratio of the resulting asymmetric mode field at the splice can be as made large as 3:1 and that this ratio may be adjusted by changing the temperature during splicing, such as with a fusion splice of a variety well known in the art.

In the second embodiment, by aligning the asymmetric mode field of the laser beam 291 from the laser source 231 with the asymmetric mode field of the PM and multi-mode optical fiber 102, 747 combination, improved efficiency may be achieved. Because the apparent asymmetry of the optical fiber 102, 747 combination arises from the fusion splice itself, it may be possible to produce the same effect by altering the fiber drawing process. If the fiber draw rate is changed during the drawing process, it may change the apparent size of the mode field to produce a similar asymmetric effect.

In typical fiber applications (in which there is no splice), the end of the optical fiber is anti-reflection coated, but there is usually a finite reflection into a cavity of the laser; this causes laser noise. In the present invention as described above, a short piece of multi-mode fiber 747 is fusion spliced to a single-mode PM fiber 102. (A longer piece of multi-mode fiber may be used during splicing, and then cleaved back.) Typical lengths of the multi-mode fiber piece vary between 50% and 100% of the cladding diameter. In order to achieve further efficient coupling, the light from the laser 231 should be focused onto the splice between the multi-mode fiber 747 and the single-mode PM fiber 102. Because the fiber materials on either side of the splice are nearly identical in refractive index, there is very little light reflected back to the laser from the splice. This helps reduce feedback into the laser 231, and reduces laser noise. The reflection from the other end of the piece of multi-mode fiber 747 is out of focus with respect to the laser 231; most of the reflected light does not re-enter the laser cavity, and thus does not significantly contribute to the laser noise.

While the present invention has been described in that of a magneto-optical drive context, it is understood that the concepts described herein are applicable to other technologies including communications and telecommunications.

Thus, it is to be understood that the above description is illustrative only and not limiting of the disclosed invention. It will be appreciated that it would be possible to modify the size, shape and appearance and methods of manufacture of various elements of the invention or to include or exclude various elements and still remain within the scope and spirit of this invention.

What is claimed is:

1. An optical apparatus for directing a laser light between a source and a destination location that exhibits a first mode field along an optical path between a source and a destination location, comprising:

a first optical element, wherein the first optical element is disposed in the optical path, and wherein the first optical element receives the laser light having a first mode field at an input and exhibits a second mode field in the light at an output; and a second optical element, wherein the second optical element is disposed in the optical path and coupled to the output of the first optical element to receive the light, and wherein the second optical element exhibits the second mode field.

2. The optical apparatus as recited in claim 1, wherein said destination location comprises a data storage location.

3. The optical apparatus as recited in claim 2, wherein the first mode field comprises an asymmetric mode field, and wherein the second mode field comprises a symmetric mode field, and the first optical element comprises an anamorphic prism.

4. The optical apparatus as recited in claim 2, wherein the second optical element comprises a single mode PM (polarization-maintaining) optical fiber.

5. The optical apparatus as recited in claim 2, wherein the second optical element comprises a multi-mode optical fiber.

6. The optical apparatus as recited in claim 2, wherein the second optical element comprises an anamorphic prism.

7. The optical apparatus as recited in claim 2, wherein the light comprises polarized light.

8. The optical apparatus as recited in claim 2, wherein the first optical element comprises a single mode optical fiber, wherein the second optical element comprises a multi-mode optical fiber, and wherein the first and second optical element are coupled to each other.

9. The optical apparatus as recited in claim 2, wherein the first mode field comprises a symmetric mode field, wherein the second mode field comprises an asymmetric mode field, wherein the second optical element comprises a single mode polarization maintaining optical fiber, and wherein the first optical element comprises a multi-mode optical fiber.

10. A storage drive for directing a laser light exhibiting a first mode field along an optical path between a source and a data storage location, comprising:

a first optical element, the first optical element disposed in the optical path, the first optical element comprising a second mode field; and a second optical element, the second optical element disposed in the optical path, wherein the second optical element matches the first and second mode fields to each other, wherein the first mode field comprises a symmetric mode field, wherein the second mode field comprises an asymmetric mode field, wherein the first optical element comprises a polarization maintaining optical fiber, and wherein the second optical element comprises a multi-mode optical fiber, for matching the first and second mode fields to each other.

11. The storage drive as recited in claim 10, wherein the second optical element is disposed in the optical path between the source and the first optical element.

12. The optical drive as recited in claim 10, wherein the storage drive comprises a magneto-optical storage drive.

13. An optical apparatus for efficiently directing a laser light exhibiting a first mode field along an optical path between a source and a data storage location, comprising:

an optical element, wherein the optical element is disposed in the optical path, and wherein the optical element exhibits a second mode field; and optical matching means for matching the first and second mode fields to each other, wherein the optical matching means is disposed in the optical path.

14. The optical apparatus as recited in claim 13, wherein the first mode field is asymmetric.

15. The optical apparatus as recited in claim 13, wherein the second mode field is circularly symmetric.

16. The optical apparatus as recited in claim 13, wherein the optical element comprises a single mode polarization maintaining optical fiber.

17. A method for directing a laser light along an optical path between a source and a data location, comprising the steps of:

providing a source of light that exhibits a first mode field in the optical path;

providing a first optical element that exhibits a second mode field in the optical path; and aligning the first and second fields to each other by providing a second optical element in the optical path.

18. The method as recited in claim 17, wherein the first mode field is asymmetric and the second mode field is symmetric.

19. The method as recited in claim 17, wherein the first optical element comprises a single mode polarization maintaining optical fiber.

20. The method as recited in claim 17, wherein the second optical element comprises a multi-mode optical fiber.

* * * * *